Sept. 1, 1942.  C. A. ELLIS  2,294,543
STORAGE TANK
Filed Dec. 14, 1939  2 Sheets-Sheet 1
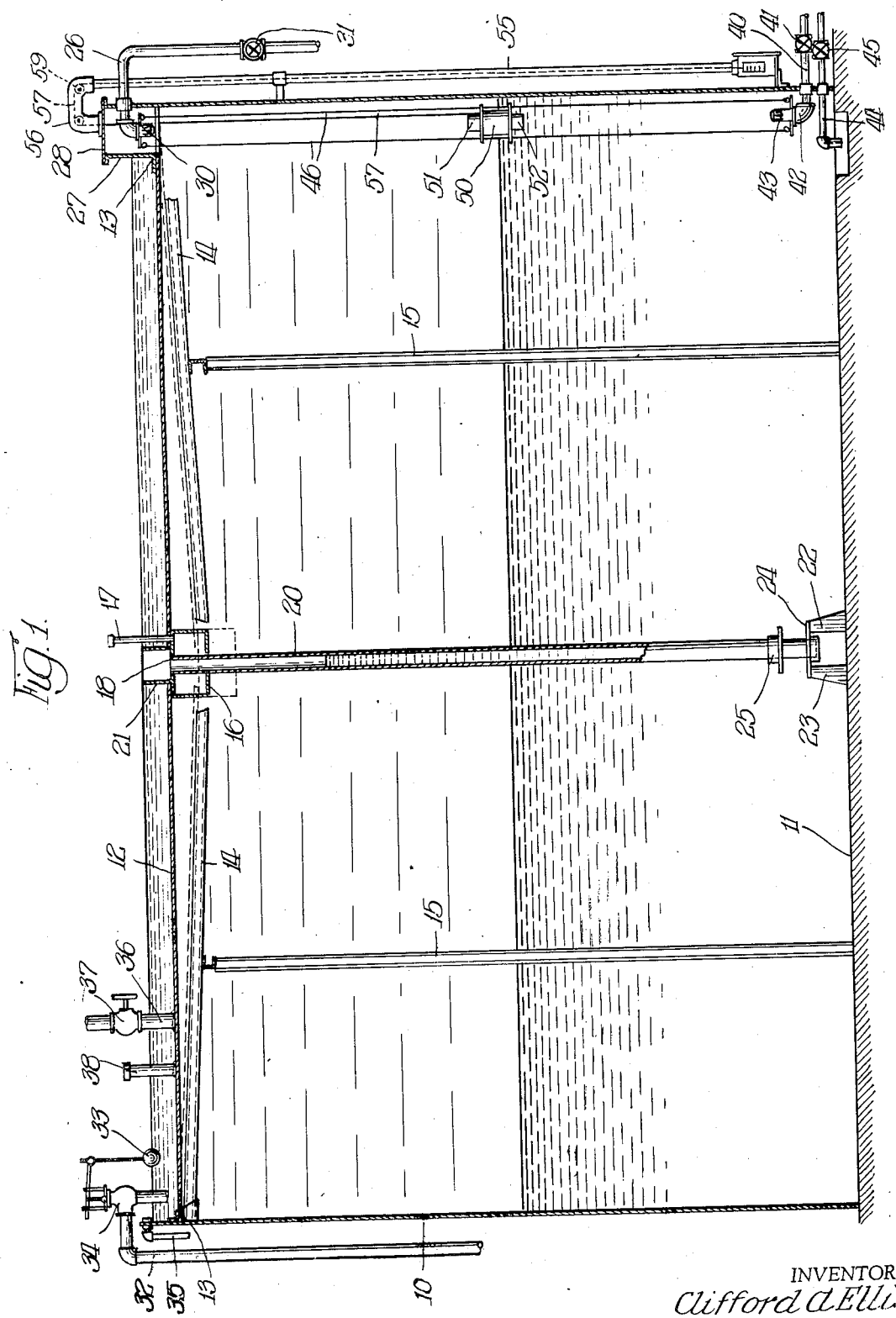
INVENTOR.
Clifford A. Ellis,
BY
ATTORNEYS.

Sept. 1, 1942.  C. A. ELLIS  2,294,543
STORAGE TANK
Filed Dec. 14, 1939   2 Sheets-Sheet 2
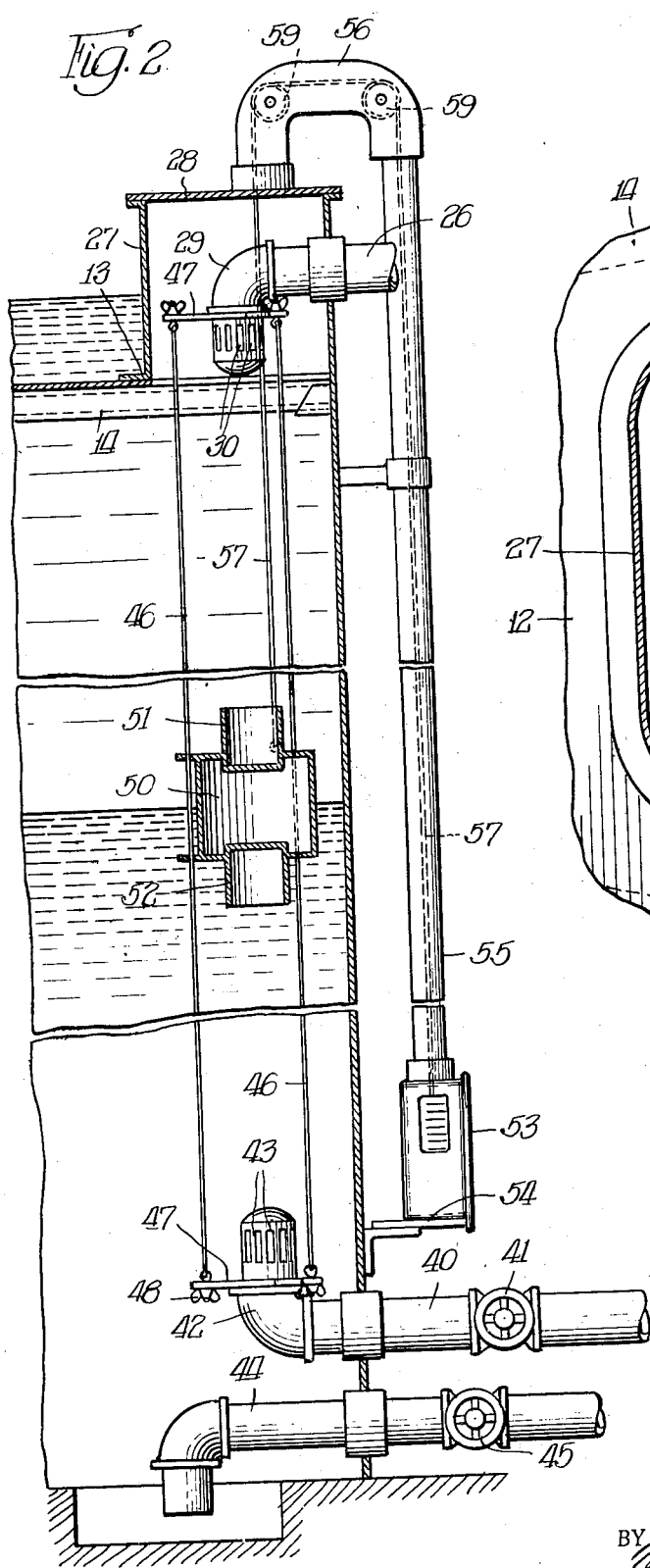
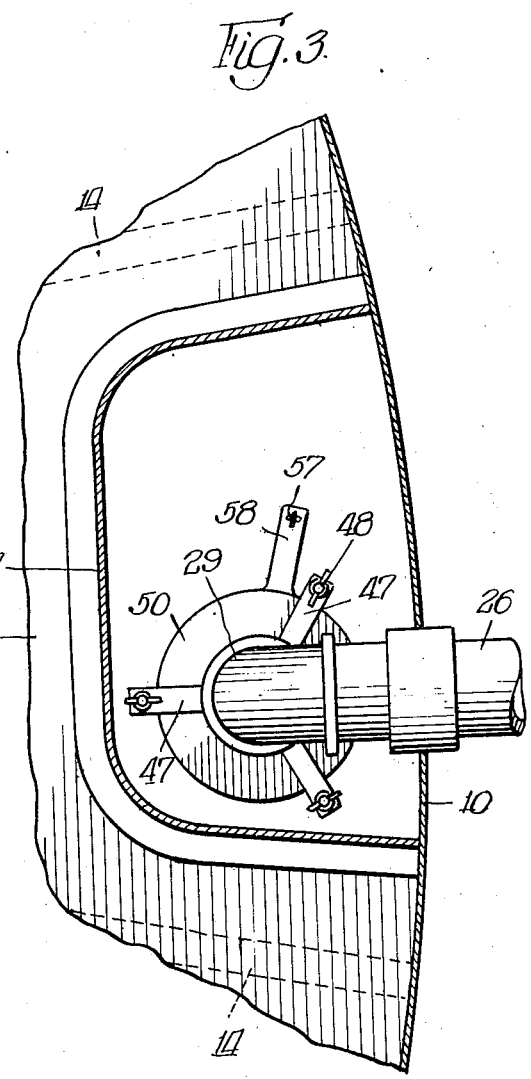
INVENTOR.
Clifford A. Ellis
BY
ATTORNEYS.

Patented Sept. 1, 1942

2,294,543

UNITED STATES PATENT OFFICE 2,294,543

STORAGE TANK

Clifford A. Ellis, Ridgefield, N. J., assignor to Graver Tank & Mfg. Co., Inc., Catasauqua, Pa., a corporation of Delaware Application December 14, 1939, Serial No. 309,170

2 Claims. (Cl. 221—67)

The invention relates to storage tanks and has reference more particularly to tanks for storing volatile liquids such as gasoline and the like.

In ordinary closed tanks the volume of space between the surface of the liquid and the roof varies inversely as the volume of the liquid in the tank. Evaporation of the liquid causes this space to become filled with saturated vapors. As a result of daily temperature changes expansion of these vapors causes some to be expelled to the atmosphere with fresh air being drawn into the tank upon contraction. Frequent expansions and contractions of this nature are known in the art as "breathing" and when coupled with repeated operations for filling the tank a considerable quantity of the stored liquid may be lost solely by evaporation.

The present invention prevents these "breathing" and other losses by providing a storage tank in which the gasoline or other liquid is stored over a quantity of water so as to maintain the liquid in contact with the roof at all times regardless of whether the tank is being filled or emptied. Since the vapor space in the tank is eliminated, evaporation of the liquid is effectively prevented.

The present invention is an improvement over the storage tank shown in my Patent No. 1,968,-673 granted July 31, 1934, wherein the liquid is stored over a layer of water or other liquid of higher specific gravity than the stored liquid and which is also non-miscible with the stored liquid. The volatile liquid is pumped into the tank and also withdrawn therefrom at a point just below the tank roof and the depth of the water in the bottom of the tank is maintained so that the liquid at all times is in contact with the roof, eliminating all vapor space within the tank. The roof is of the flexible or diaphragm type and its vertical movement is utilized to automatically regulate and control the flow of water into and out of the tank.

It is an object of the present invention to improve the above type of storage tank by providing float-controlled means for substantially cutting off the flow of the volatile liquid from the tank when approximately all has been withdrawn to thereby prevent any water from passing over into the stored liquid line and which will also have operation to substantially cut off the flow of water when the water level reaches a predetermined low point in the tank, preventing any volatile liquid from passing over into the water line.

Another object of the invention is to provide a float which will maintain a position on the dividing line between the stored liquid and water, being partly submerged in both liquids, and which will move vertically as the tank is filled and emptied, whereby said float will function as an indicator to show the proportion of volatile liquid and water in the tank.

A more specific object is to provide a storage tank of the type described having an inlet-outlet conduit at its upper end for the passage of the stored liquid and having another conduit at its lower end for the passage of the water and wherein means are provided having vertical movement in accordance with variations in the proportion of stored liquid and water within the tank for substantially reducing the flow of each liquid as it is being withdrawn from its respective conduit when the quantity of said liquid remaining in the tank reaches a predetermined low limit.

A further object of the invention is to provide a tank having float-controlled means of the character described and which may be readily removed for repair or replacement purposes.

Another object of the invention is to provide visual indicating means operated by float-controlled means within the tank and which will register at all times the approximate quantity of water and stored liquid within the tank.

With these and various other objects in view, the invention may consist of certain novel features of construction and operation, as will be more fully described and particularly pointed out in the specification, drawings and claims appended hereto.

In the drawings, which illustrate an embodiment of the invention, and wherein like reference characters are used to designate like parts—

Figure 1 is a vertical sectional view showing a hydro-gasoline tank embodying the improved features of the present invention;

Figure 2 is an enlarged fragmentary sectional view illustrating the construction and operation of the float-controlled means for the liquid outlets; and Figure 3 is a fragmentary top plan view looking into the manhole opening for inserting the float-controlled means within the tank.

Referring to the drawings, the reference character 10 indicates a cylindrical tank having a bottom 11 and a roof 12. The roof 12 is a flexible or diaphragm type of roof suitably secured around its periphery 13 to the inside of the cylindrical tank. The roof is suitably supported in a concave position by rafters 14 extending radially inward toward the center of the tank and which are supported by the uprights or columns 15. The rafters terminate short of the center of the tank so as to provide a circular opening within which is located the hollow float box or pontoon 16, the same being suitably secured to the roof 12 and having an inspection tube 17. The roof is preferably fabricated of light steel plates and when not in its normal position is concave or dished, as shown in dotted lines in Figure 1.

The central aperture 18 receives the upper end of a cylindrical pipe 20 of relatively large diameter and of light weight and which is suitably secured to the roof so as to provide an air and water-tight joint therewith. It will be noted that the pipe passes through the pontoon 16 and with respect to this element an air and water-tight joint is also provided. The inlet end of pipe 20, projecting above the roof, is enlarged as at 21, and the lower end of the pipe is guided by means of a base support 22 formed of triangular-shaped members 23 joined by a ring 24. The lower end of the pipe 20 passes through said ring and a similar ring 25 is suitably secured to the pipe so as to form a stop with the base support when the pipe assumes its low position. The pontoon 16, secured to the underside of the roof 12 and to the pipe 20, is of sufficiently large proportions to sustain the pipe in a floating position when the pontoon is entirely immersed in the volatile liquid stored in the tank. During the time the product is stored in the tank the same will exert an upward pressure on the roof and which will flex the roof upwardly to a slight extent. When this upward pressure is released the roof will flex downwardly.

In practice only a few ounces of pressure will be required to flex the roof upwardly and the distance through which the center portion moves is preferably limited so that the roof will not be reversed in curvature and caused to convex outwardly.

The liquid to be stored is introduced into the tank and withdrawn therefrom through the pipe line 26 connected to the upper portion of the tank and preferably at a point so as to project within the opening formed by the manhole 27 normally closed by the cover 28. This positions the pipe line 26 above the roof of the tank and although the same is provided with a depending end 29 having openings 30 the said openings are positioned just slightly above the horizontal line formed by the roof. The conduit 26 is provided with an exterior manually operated valve 31 which must be opened when the stored liquid is withdrawn or admitted to the tank.

The water over which the liquid is stored is introduced into the bottom of the tank through pipe 20 and which is open at its lower end. The water is supplied to the roof 12 by the water supply line 32 having the float structure 33 for automatically actuating the supply valve 34. The outlet end of valve 34 terminates adjacent the roof 12 and is normally below the level of the water on the roof. In positions of the roof below its normal position, shown in full lines in Figure 1, the water will flow over the edge of the enlarged inlet 21 which forms the intake end of the pipe 20. The upper level of the water on the roof 12 is limited by means of an over-flow pipe 35. The pipe 36 extending upwardly from the roof 12 and having the valve 37 provides a vapor vent for the release of vapors from within the tank and the smaller upstanding pipe 38 is provided so that sediment which will accumulate in the bottom of the tank can be gauged from time to time. The water is withdrawn from the tank 10 through the pipe 40 having the manually actuated valve 41, as best shown in Figure 2. Said pipe extends into the tank near the bottom thereof and is provided with an upwardly projecting portion 42 provided with openings 43. When it is desired to drain the tank the water is allowed to flow through the drain pipe 44 and which is also provided with a manually actuated valve identified by numeral 45.

During operation of the storage tank above described it is desired that the water should at all times remain above the outlets 43 in the pipe 40. Likewise when withdrawing the stored liquid the flow should be stopped before the water level reaches the outlets 30 of the pipe 26. The invention provides float-controlled means for accomplishing the above objects and which is guided in its vertical movement within the tank by guide wires 46 extending from the depending portion 29 to the upstanding portion 42. Each respective portion has suitably secured thereto a collar having three equally spaced extensions 47, Figure 3, which extensions are slotted at their ends for receiving the wing nuts 48 to which are connected the respective ends of the guide wires 46. By using wing nuts the wires can be tensioned to facilitate movement of the float member to be presently described and said wires can be readily released when it is desired to remove the float member from the tank. For this purpose the manhole opening 27 in the top of the tank has been made considerably wider than would otherwise be necessary. It will be observed that the pipe 26 enters the manhole opening at one end and normally the equipment is maintained in alignment with the depending end 29 of said pipe. The other end of the manhole opening is therefore available when it is necessary to remove the guide wires and float member for repair or replacement.

Referring to Figure 2, the float member 50 is shown in section. Said member comprises a hollow, preferably cylindrical receptacle which is adapted to float partly submerged in the water and partly submerged in the stored liquid. In other words, the member 50 will occupy a position on the line between the two liquids within the tank and any change in the proportion of said liquids will result in movement of the member vertically on the guide wires 46. The upper end of the float member 50 is provided with an up-turned cup 51 having a diameter just slightly greater than the diameter of the depending portion having the openings 30. The lower end of the member 50 is likewise provided with a cup 52 which in this case has its open end directed downwardly and which is just slightly larger than the portion having the water outlets 43 therein. In operation the cups 51 and 52 function to substantially reduce the flow of its respective liquid from the tank when the quantity of said liquid remaining reaches a predetermined low limit. Assuming that gasoline is being pumped into the tank through pipe 26 this accordingly requires water to be withdrawn through the openings 43 and pipe 40. As the water level descends the float member 50 will likewise descend until eventually the cup 52 will telescope the openings 43, materially reducing the flow of the water through said openings and which is an indication to the operator that the water within the tank has reached a low level below which water should not be withdrawn. He thereupon cuts off the flow of the gasoline to the tank. The reverse operation of the float member is substantially the same. This takes place when the gasoline is being withdrawn from the tank and water is being delivered to the bottom of the tank from the roof through the pipe 20. When almost all the gasoline has been withdrawn, and in order to prevent water from passing over into the gasoline line, the float will have reached an upper limit so as to cause cup 51 to telescope the openings 30. When the flow is materially reduced, the operator closes valve 31 and no more gasoline can flow from the tank.

The invention provides visual indicating means having connection with the float member so as to indicate at any time the proportion of water and stored liquid within the tank. The indicator 53 is suitably supported exteriorly of the tank, preferably near the bottom thereof, on any suitable support such as 54. A pipe 55 extends vertically from the indicator and by means of the elbow portion 56 the said pipe has connection with the manhole cover 28. The elbow portion 56 may be readily disconnected from both the manhole cover and pipe 55 when it is necessary to remove said cover. The cable 57 extends from the indicator 53 to the float member 50, being connected to the arm 58, Figure 3, extending outwardly from the float member. In the elbow portion 56 the cable passes over pulleys 59. As the float moves vertically within the tank in accordance with variations in proportion of water and stored liquid the indicating means 53 is actuated and therefore it is possible for the operator to know at all times the exact contents of the storage tank.

The roof remains in neutral position until more liquid is withdrawn from the tank or until liquid is delivered to the tank for storage. It has been previously explained that the action of the liquid within the tank is to exert an upward pressure on the roof to flex the roof upwardly a slight extent. However, when the pressure is released the roof will flex downwardly. This latter condition occurs when either liquid is withdrawn from the tank. In the case of the stored liquid being withdrawn, movement of the roof downwardly will allow water from the roof to enter pipe 20 and flow from said pipe into the tank to take up the space previously occupied by the stored liquid. As liquid is removed from the roof the float 33 actuates valve 34 so that more water is supplied to maintain the proper level on the roof. The above operations continue until valve 31 is closed by the operator, shutting off further withdrawal of volatile liquid, whereupon any further water supplied to the tank will cause the roof to flex upwardly to its normal position and automatically cut off the supply of water to pipe 20. In the operation of supplying volatile liquid to the tank it will be understood that water is simultaneously withdrawn through the outlet pipe 40 and the space provided by the removal of water from the bottom of the tank is of course immediately taken up by the volatile liquid being supplied at the upper portion of the tank. In this case the roof maintains a substantially normal position and only in the event the pressure within the tank drops to an extent to allow the roof to descend into a concave position does the roof function to supply water to the tank. It very often happens at the end of a filling operation that the pressure on the roof drops since it is necessary to first shut off valve 31 in pipe 26 supplying the volatile liquid and then close valve 41 in the water outlet pipe. As a result the roof will descend to allow liquid to overflow into pipe 20 and by reason of the head maintained in pipe 20 water will flow into the tank to bring the roof to its normal position.

It will be observed that the manhole 21 extends upwardly from the roof and that the volatile liquid is drawn off at a point above the horizontal line formed by the roof when in normal position. As a result of this structure it is possible to wash the tank and to float the foreign particles up through the manhole opening, whereupon they can be easily removed or can be automatically washed from the tank by overflowing the manhole opening, for which purpose it is necessary to remove the cover 28.

In the type of tank herein described the stored liquid is always in contact with the roof and since there is no vapor space in the tank the evaporation of the stored liquid is completely eliminated. Moreover, a blanket of water is maintained on the roof to insulate the same against the heat of the sun and which also maintains the stored liquid at a considerably lower temperature than would otherwise be the case. With the float member having vertically guided movement within the tank in accordance with variations in the proportion of stored liquid and water, means are provided for automatically preventing water from passing over into the volatile liquid line and for also preventing the volatile liquid from passing over into the water line. Also during operation of the tank the float member serves to actuate a visual indicator so that the operator may know the approximate content of the tank at all times.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. In a storage tank adapted to store a volatile liquid over a layer of water, means delivering water to the tank as the volatile liquid is withdrawn to maintain the tank substantially filled, a water outlet pipe located at the base of the tank for withdrawing water therefrom, a supply pipe at the upper end of the tank for introducing into and withdrawing from the same a volatile liquid, a float member adapted to float on the surface of the water to thereby assume a position corresponding to the level of the water within the tank, guiding means extending vertically of the tank and aligned with the terminal end of the supply pipe and the water outlet pipe for guiding the said float member, and means fixed to the upper and lower end of the float member and adapted to telescope the terminal end of said supply pipe and water outlet pipe respectively, said float member and means fixed thereto operating automatically to substantially reduce the flow of each liquid respectively during withdrawal of the same in the event the quantity of said liquid remaining in the tank reaches a predetermined low limit.

2. In a storage tank for volatile liquids, a roof therefor having a manhole opening extending upwardly, means extending into said manhole opening at a point above the horizontal plane formed by the roof for introducing into and withdrawing from the tank a volatile liquid, means delivering water to the bottom of said tank as the volatile liquid is withdrawn whereby said volatile liquid is stored over a layer of water and the tank is maintained substantially full at all times, an outlet for the water located adjacent the bottom of the tank, a float member adapted to sink in the volatile liquid but to float on the surface of the water to thereby maintain a position corresponding to the level of the water within the tank, means depending from said manhole opening to the bottom of the tank for guiding said float member in its vertical movement so that the same will move in alignment with the terminal end of the supply means for the volatile liquid and the outlet for the water, said float member being constructed and having operation to automatically reduce the flow of each liquid respectively during withdrawal of the same in the event the quantity of said liquid remaining in the tank reaches a predetermined low limit.

CLIFFORD A. ELLIS.